(12) United States Patent
Dangelmaier et al.

(10) Patent No.: US 10,976,572 B2
(45) Date of Patent: Apr. 13, 2021

(54) METHOD FOR STORING INFORMATION ON A SPECTACLES LENS, SPECTACLES LENS BLANK OR SPECTACLES LENS SEMI-FINISHED PRODUCT

(71) Applicant: Carl Zeiss Vision International GmbH, Aalen (DE)

(72) Inventors: Andreas Dangelmaier, Aalen (DE); Simon Holtmann, South-Brighton (AU); Roland Schoen, Aalen (DE); Matthias Hornauer, Lauchheim-Huelen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/603,154

(22) Filed: May 23, 2017

(65) Prior Publication Data

US 2017/0261765 A1    Sep. 14, 2017

Related U.S. Application Data

(63) Continuation-in-part of application No. 14/987,458, filed on Jan. 4, 2016, now abandoned, which is a
(Continued)

(30) Foreign Application Priority Data

Dec. 22, 2011  (DE) ...................... 10 2011 089 704.6

(51) Int. Cl.
*G02C 7/02*    (2006.01)
*B29C 59/16*   (2006.01)
(Continued)

(52) U.S. Cl.
CPC .............. *G02C 7/021* (2013.01); *B29C 59/16* (2013.01); *C03C 19/00* (2013.01);
(Continued)

(58) Field of Classification Search
CPC .... G02C 7/021; G02C 13/003; B24B 13/005; B24B 13/0055; G06K 19/06178;
(Continued)

(56) References Cited

U.S. PATENT DOCUMENTS 4,310,242 A    1/1982  Genco et al.
5,960,550 A *  10/1999 Weir .................... G02C 7/021
                                                    33/200
(Continued)

FOREIGN PATENT DOCUMENTS

DE   10 2007 037 730 A1   2/2009
WO      03/049952 A2      6/2003

OTHER PUBLICATIONS

International Search Report dated Apr. 3, 2013 of international application PCT/EP2012/076613 on which this application is based.
(Continued)

*Primary Examiner* — George G King
(74) *Attorney, Agent, or Firm* — Walter Ottesen, P.A.

(57) ABSTRACT

Information is stored in an optical element in the form of a glass or plastic body embodied as spectacles lens, spectacles lens blank or spectacles lens semi-finished product. The information in the form of data is stored on or in the glass or plastic body by creating at least one marking with a marking system. The marking can be read by a reading apparatus. The marking system has an interface for reading information individualizing the optical element. The marking is created permanently by the marking system on or in the optical element at a definition point of a local body-specific coordinate system set by two points on or in the optical element. In this body coordinate system, the manufacturer specifies the position of the lens horizontal and/or the far and/or the near and/or the prism reference point.

18 Claims, 5 Drawing Sheets

Related U.S. Application Data continuation of application No. 14/312,267, filed on Jun. 23, 2014, now abandoned, which is a continuation of application No. PCT/EP2012/076613, filed on Dec. 21, 2012.

(60) Provisional application No. 61/585,149, filed on Jan. 10, 2012.

(51) Int. Cl.
| | | |
|---|---|---|
| *G02C 13/00* | (2006.01) | |
| *G06K 7/10* | (2006.01) | |
| *C03C 23/00* | (2006.01) | |
| *G06K 19/06* | (2006.01) | |
| *C03C 19/00* | (2006.01) | |
| *G01N 21/958* | (2006.01) | |

(52) U.S. Cl.
CPC ....... *C03C 23/0025* (2013.01); *G01N 21/958* (2013.01); *G02C 13/003* (2013.01); *G06K 7/10* (2013.01); *G06K 7/10732* (2013.01); *G06K 19/06037* (2013.01); *G06K 19/06178* (2013.01); *G01N 2021/9583* (2013.01); *G06K 7/10722* (2013.01)

(58) Field of Classification Search
CPC ......... G06K 7/10722; G06K 19/06037; G06K 7/10; G06K 7/10732; C03C 19/00; C03C 23/0025; G01N 21/958; G01N 2021/9583; B29C 59/16
USPC .......................................... 351/159.69, 159.8
See application file for complete search history.

(56) References Cited

U.S. PATENT DOCUMENTS

| | | |
|---|---|---|
| 6,188,040 B1 | 2/2001 | Darmes et al. |
| 6,743,486 B1 | 6/2004 | Miyazawa |
| 7,423,741 B2 | 9/2008 | Hornauer et al. |
| 7,728,962 B2 | 6/2010 | Hornauer et al. |
| 8,115,792 B2 | 2/2012 | Petsch et al. |
| 2002/0134846 A1 | 9/2002 | Brooks et al. |
| 2005/0248740 A1* | 11/2005 | Veen .................. G03F 7/70425 355/53 |
| 2006/0192944 A1 | 8/2006 | Hornauer et al. |
| 2007/0115429 A1 | 5/2007 | Divo |
| 2008/0051012 A1* | 2/2008 | Akiyama ................ B24B 9/146 451/42 |
| 2008/0098584 A1 | 5/2008 | Meyer et al. |
| 2009/0302122 A1 | 12/2009 | Begon |
| 2010/0141729 A1 | 6/2010 | Petsch et al. |
| 2010/0283999 A1 | 11/2010 | Takeyama et al. |
| 2012/0314186 A1 | 12/2012 | Levraud et al. |
| 2013/0105386 A1 | 5/2013 | Deville et al. |
| 2013/0148111 A1 | 6/2013 | Hanssen et al. |

OTHER PUBLICATIONS

Written Opinion of the international search authority dated Apr. 3, 2013 of international application PCT/EP2012/076613 on which this application is based.

Preliminary Report on Patentability and Written Opinion of the international search authority dated Jul. 3, 2014 of international application PCT/EP2012/076613 on which this application is based.

English translation of the Office action of the Chinese Patent Office dated Mar. 13, 2015 in the corresponding Chinese patent application 201280063522.5.

Office action of the European Patent Office dated Aug. 20, 2015 in the corresponding European patent application 12818506.3-1562.

DIN EN ISO 13666: Nov. 1998 of the DIN Deutschen Institut fuer Normung, e.V., Nov. 1998, pp. 1 to 51.

DIN EN ISO 8980-2, Ophthalmic optics—Uncut finished spectacle lenses—Part 2: Specifications for progressive power lenses (ISO 8980-2:2004), standard by DIN-adopted European-adopted ISO Standard, May 1, 2004, 13 pages and English translation thereof.

ISO/IEC 16022:2006(E): International Standard, "Information technology—Automatic identification and data capture techniques—Data Matrix bar code symbology specification", second edition, Sep. 15, 2006, 142 pages.

ISO/IEC 2382:2015, International Organization for Standardization, "Information technology—Vocabulary", May 1, 2015, 760 pages.

Office action of the European Patent Office dated Apr. 13, 2016 in the corresponding European patent application 12818506.3-1562.

ANSI, "American National Standard for Ophthalmics—Prescription Spectacle Lenses", ANSI Z80.1-2010, revision of ANSI Z80.1-2005, copyright 2010, pp. 1 to 46.

* cited by examiner

METHOD FOR STORING INFORMATION ON A SPECTACLES LENS, SPECTACLES LENS BLANK OR SPECTACLES LENS SEMI-FINISHED PRODUCT

CROSS REFERENCE TO RELATED APPLICATIONS

This application is a continuation-in-part application of patent application Ser. No. 14/987,458, filed Jan. 4, 2016, which, in turn, is a continuation application of patent application Ser. No. 14/312,267, filed on Jun. 23, 2014, now abandoned, which, in turn, is a continuation application of international patent application PCT/EP2012/076613, filed Dec. 21, 2012 which designates the United States and claims priority from U.S. Provisional Application No. 61/585,149 filed Jan. 10, 2012, and German patent application 10 2011 089 704.6 filed Dec. 22, 2011. The present continuation application claims priority to each of the above applications and incorporates herein the entire contents thereof by reference.

FIELD OF THE INVENTION

The invention relates to a method for storing information on a glass or plastic body embodied as spectacles lens, as spectacles lens blank for a spectacle lens or spectacles lens semi-finished product for a spectacle lens. Moreover, the invention relates to a glass or plastic body in the form of a spectacles lens, a spectacles lens blank for a spectacles lens or a spectacles lens semi-finished product for a spectacles lens, including a marking arranged at a definition point of the local coordinate system. Moreover, the invention relates to an apparatus for storing information on a spectacles lens, a spectacles lens blank for a spectacles lens or a spectacles lens semi-finished product for a spectacles lens.

BACKGROUND OF THE INVENTION

Here, a spectacles lens blank is understood to mean a usually pre-shaped piece of material for producing a lens, in any state before the surface treatment has been completed. Spectacles lens semi-finished goods, which are also referred to as spectacles lens semi-finished products, are lens blanks where the optical processing has only been finished on one surface.

In order to provide a spectacles wearer with sharp vision, the spectacles lenses in a spectacles frame must be positioned and aligned correctly with respect to the eyes of the spectacles wearer. This is particularly important in the case of progressive power lenses. Progressive power lenses provide spectacles wearers with sharp vision at different ranges, without requiring accommodation of the eyes. Progressive power lenses have a distance or far reference point and a near reference point.

Specialists also refer to the near reference point and the far reference point of progressive power lenses as near design reference point and far design reference point respectively. A definition of these points is specified in Chapters 5.13 and 5.14 of the EN ISO 13666:1998 standard, the entire content of which is incorporated herein by reference. The American National Standard for Ophthalmics—Prescription Spectacle Lenses ANSI Z80.1-2010 by the American National Standards Institute, Inc. is incorporated herein by reference in its entirety.

However, optimum vision with progressive power lenses presupposes that the progressive power lenses held in a spectacles frame are positioned in front of the eyes of the spectacles wearer such that the position of the far reference point and the position of the near reference point coincide with the corresponding viewing directions of the spectacles wearer into the far and into the near thereof. It is for this reason that, pursuant to the specifications in Section 7 of the standardization regulations DIN EN ISO 8980-2:2004 also incorporated herein by reference, progressive power spectacles lenses must be permanently provided with at least two markings. Pursuant to the aforementioned standard, these at least two markings must exist on a progressive power spectacles lens with a spacing of 34 mm and must be arranged symmetrically with respect to a vertical plane through the fitting point or the prism reference point. These two markings define a local, body-specific coordinate system for the spectacles lens. These markings can be used to reconstruct in a spectacles lens both the lens horizontal and the far and near reference points, the so-called fitting point defined in Chapter 5.24 of the EN ISO 13 666:1998 standard or the prism reference point defined in Chapter 14.2.12 of the EN ISO 13 666:1998 standard incorporated herein by reference.

Pursuant to the EN ISO 13 666:1998 standard, the fitting point is a point on the front surface of a spectacles lens or spectacles lens semi-finished product, which, according to the specification from the manufacturer, should serve as reference point for positioning the spectacles lens in front of the eyes.

In the case of uncut spectacles lenses, which an optician receives from a spectacles lens manufacturer after measuring the spectacles, the position of these points is implicitly specified by the aforementioned markings. That is, an optician can establish the far and near reference point, the fitting point and the prism reference point on the basis of the aforementioned markings. Pursuant to the EN ISO 13 666: 1998 standard, the prism reference point is the point specified by a manufacturer on the front surface of a progressive power spectacles lens or a progressive power spectacles lens semi-finished product at which the prismatic effects of the completed lens have to be determined.

This makes it easier for an optician to align the uncut spectacles lens correctly prior to grinding and then to insert it into a spectacles frame in the correct position such that the spectacles wearer is provided with optimum vision.

In order to ensure that specifications on a spectacles lens do not have an adverse effect on the vision of the spectacles wearer, the specifications applied by the manufacturer to an uncut spectacles lens are removed as far as possible by an optician before the lens is inserted into a spectacles frame. The result of this is that, for example, the position of the near and far reference points of a spectacles lens can only be established with comparatively much effort after being inserted into a spectacles frame.

SUMMARY OF THE INVENTION

An object of the invention is to save individual spectacles lens information on a glass or plastic body in the form of a spectacles lens or a spectacles lens precursor, that is, a spectacles lens blank or a spectacles lens semi-finished product, such that the vision of a spectacles wearer therethrough is not adversely affected and that this information can also be accessed when the spectacles lens, or a spectacles lens manufactured from the spectacles lens blank, is inserted into a spectacles frame or has fallen out of a spectacles frame.

This object is achieved by a method for storing information in the form of data on a glass or plastic body embodied as spectacles lens, spectacles lens blank or spectacles lens semi-finished product, in which the information on or in the glass or plastic body is stored by creating at least one permanent marking, which can be read by a reader, by means of a marking system, which has an interface for reading information individualizing this glass or plastic body, with the at least one permanent marking being created on or in the glass or plastic body at a definition point of a local body-specific coordinate system set by two points on or in the glass or plastic body, for the manufacturer-side specification of the position of the lens horizontal and/or the far and/or the near and/or the prism reference point.

Within the context of this invention, data is, pursuant to the DIN ISO/IEC 2382 standard, in this case understood to mean structures of signs or continuous functions, which constitute information as a result of known or implied conditions. DIN ISO/IEC 2382 is incorporated herein by reference.

The method according to the invention renders it possible to store information individualizing a spectacles lens permanently on a spectacles lens glass or plastic body, without this needing to exceed the number of permanent markings prescribed in the standardization regulation DIN EN ISO 8980-2:2004 incorporated herein by reference.

Here, information individualizing a spectacles lens is understood to mean information which is different for each spectacles lens in a large set with billions of spectacles lenses, corresponding to a chassis number in motor vehicles. By way of example, a natural number with sufficiently many digits is suitable as information individualizing a spectacles lens. The information individualizing a spectacles lens more particularly renders it possible to avoid mix ups between spectacles lenses or spectacles lens blanks in an operating manufacturing process, through which several 10 000 spectacles lens blanks often pass in one day. Individualization information for spectacles lenses also makes it easier to search for errors in a manufacturing process because, accordingly, manufacturing errors in individual spectacles lenses can then be related to specific process steps. Spectacles lens manufacturing can also be automated more easily with information that individualizes spectacles lenses and is stored on the spectacles lenses because the individual glass or plastic bodies can be uniquely identified before, during or after each process step during manufacturing, and hence a so-called batch tracking is possible. Moreover, information individualizing a single spectacles lens can simplify and improve the quality control of spectacles lenses over the manufacturing process.

The long-lasting marking applied to the spectacles lens by the marking system is a permanent marking. Here, a permanent marking of a glass or plastic body in the form of a spectacles lens, spectacles lens blank or spectacles lens semi-finished product is understood to mean a marking which adheres to a spectacles lens over the whole service life thereof.

In particular, such a permanent marking provides protection against brand piracy because it can be used to identify a spectacles lens uniquely. By way of example, the permanent marking can be created by laser engraving, chiselling, micro-drilling, impressing or printing.

The marking created on or in the glass or plastic body being a phase object renders it possible that this marking is not visible to a spectacles wearer when wearing corresponding spectacles and does not bother the spectacles wearer.

Here, a phase object is understood to mean an object which, when irradiated by light in the visible spectral range, only changes the phase of the light waves passing through the object without there being a significant influence on the amplitude of the light waves in the process. To the unarmed eye of an observer, that is, an eye without artificial visual aids, the marking on or in the glass or plastic body of a spectacles lens then is invisible.

A high-quality phase object marking in a spectacles lens glass or plastic body can be created by an excimer laser in particular. It is possible to use such an excimer laser to create a marking by burning a multiplicity of pixels into a glass or plastic body embodied as spectacles lens, spectacles lens blank or semi-finished product. Here, one feature of the invention is that this marking does not adversely affect the vision of a spectacles wearer if the pixels have a diameter D lying in the range 60 $\mu m \leq D \leq 100$ $\mu m$ and have a depth T which lies in the range of 0.5 $\mu m \leq T \leq 2.5$ $\mu m$. Such a marking renders it possible to store information in the form of a digital code on a spectacles lens glass or plastic body, which code is composed of individual pixels. The digital code can be a data matrix code, more particularly a data matrix code pursuant to the ISO/IEC 16022:2000 standard, for example, a DataMatrix ECC200 code which is incorporated herein by reference. In the process, it was found that a marking with a square external contour which has a side length A of between 1.5 mm and 2.5 mm is able to store about 1600 bits of information, that is, the information of more than 1 billion numbers. As a result of the geometric centroid of the convex envelope of the marking, for example, the data matrix code, being a definition point of a local coordinate system defining the lens horizontal and/or the far and/or the near reference point, a definition point of this coordinate system can be specified very precisely.

Such a code renders it possible to create patterns with a contour, the convex envelope of which reproduces a trademark and/or a company logo. In particular, such a code can replicate a trademark and/or company logo created by laser inscription or printing on the spectacles lens.

An idea of the invention is also to use such a pattern of the pixels which, for example, form a data matrix code, and a further marking, for example embodied as trademark and/or company logo, created on or in the glass or plastic body to define the local glass or plastic body coordinate system for the manufacturer-side specification of the position of the lens horizontal and/or the far and/or the near and/or the prism reference point.

A spectacles lens, on which information is stored such that the spectacles lens is individualized as a result thereof and the position of the local coordinate system is specified, allows fast identification of assembly errors in a spectacles frame, particularly in the case of progressive power lenses. Such a spectacles lens with the information stored thereon can also be protected from forgery.

An apparatus enabling the storage according to the invention of information on a glass or plastic body in the form of a spectacles lens, spectacles lens semi-finished product or spectacles lens blank contains an interface connected to a marking system, for reading in digital information that individualizes the spectacles lens. The marking system is coupled to a referencing arrangement for establishing the relative position of the spectacles lens coordinate system with respect to the coordinates of the marking system. The interface transmits information that individualizes the glass or plastic body to the marking system. In the process, the marking system creates a marking containing this information on the spectacles lens. In the process, the marking system applies the marking to a definition point of a local glass or plastic body coordinate system, that is, a body-specific coordinate system, which defines the lens horizontal and/or the far and/or the near reference point and/or the prism reference point.

The information stored on a spectacles lens glass or plastic body as described above can then be read by a reading apparatus. Such a reading apparatus preferably contains a light source for generating an illumination light beam which passes through a spectacles lens to be read. After passing through the spectacles lens, the illumination light beam is reflected at a reflector. Thus it once again passes through the spectacles lens and is then fed to a camera. This camera is connected to a computer unit which contains a program storage medium with an evaluation program for capturing and decoding the digital information from the marking.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
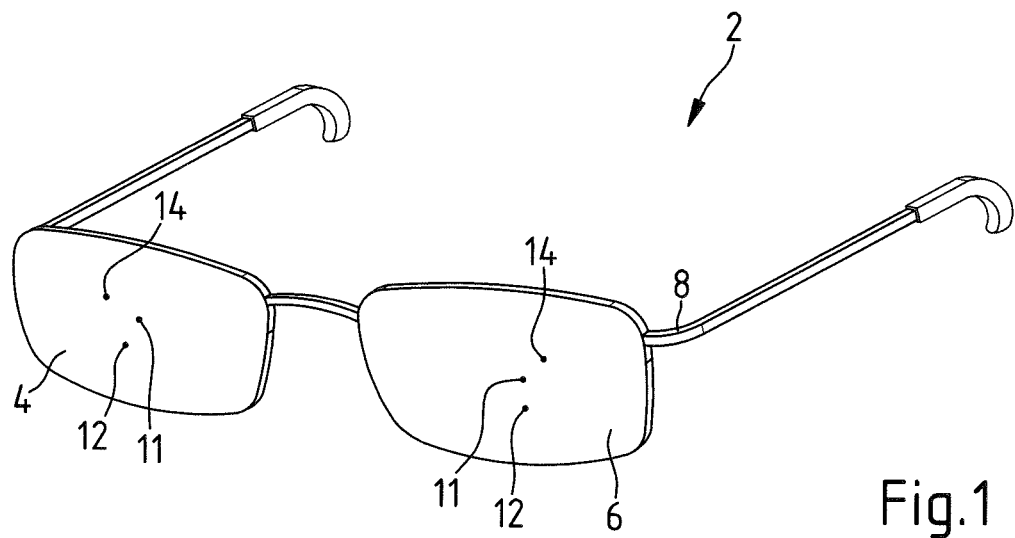
FIG. 1 is a perspective view of a progressive power spectacles with spectacles lenses.

The progressive power spectacles 2 in FIG. 1 has two glass or plastic bodies (4, 6), namely, a first progressive power spectacles lens 4 and a second progressive power spectacles lens 6. The spectacles lenses (4, 6) are fixed in a spectacles frame 8. The topography of the spectacles lenses (4, 6) is fitted to the individual vision requirements of a spectacles wearer. The spectacles lenses (4, 6) each contain a prism reference point 11. They each have a near reference point 12 and a far reference point 14. In respect of the near reference point 12 and the far reference point 14, a spectacles lens manufacturer also specifies the refractive index of the spectacles lens there for an optician so that the latter can check the spectacles lens obtained from the manufacturer. In respect of the prism reference point 11, the manufacturer provides an optician with the specific prismatic effect of the spectacles lens.

Figure 2:
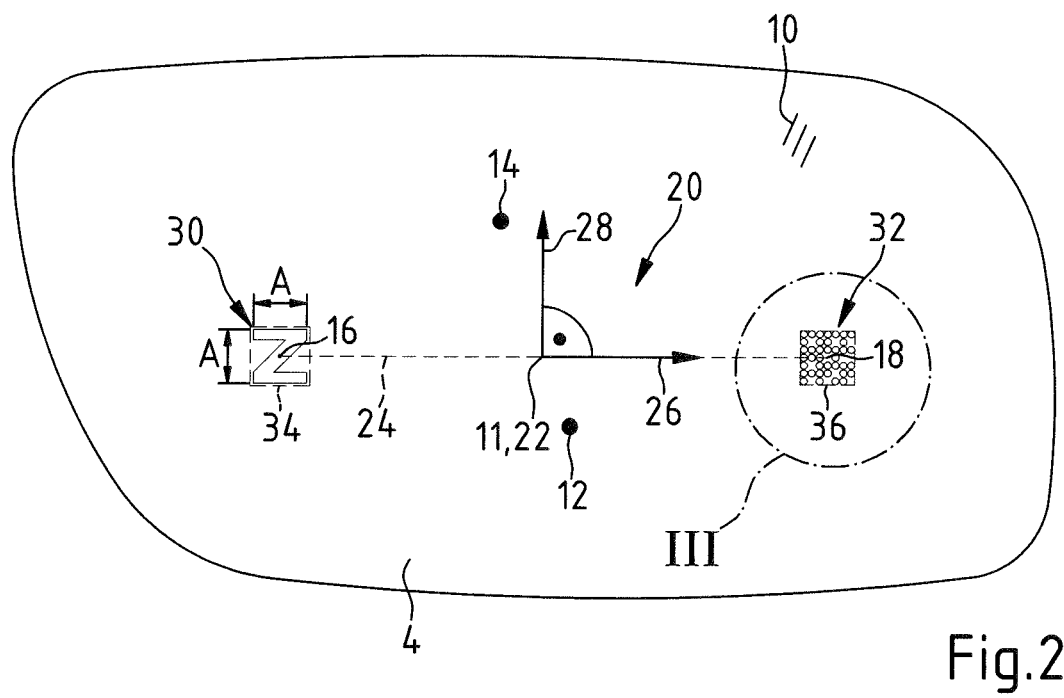
FIG. 2 shows a spectacles lens of the progressive power spectacles with markings that define a local coordinate system.

FIG. 2 shows the spectacles lens 4 of the progressive power spectacles 2 from FIG. 1 in an enlarged view. On lens surface 10 facing an observation object, the spectacles lens 4 has a marking point 16 and a marking point 18. The marking points (16, 18) define a local body-specific glass or plastic body coordinate system 20 for the spectacles lens 4. The local glass or plastic body coordinate system 20 has an origin 22 which, for example, coincides with the prism reference point 11 of the spectacles lens 4 and which is situated at the center of the imaginary connecting line 24 between the marking points (16, 18). The X-axis 26 of this local glass or plastic body coordinate system 20 is parallel to the imagined connecting line 24. The course of the X-axis of the local glass body coordinate system 20 corresponds to the lens horizontal of the spectacles lens 4. The Y-axis 28 of the coordinate system 20 is perpendicular to the imagined connecting line 24. The marking points (16, 18) are the two definition points for the local glass body coordinate system 20 of the spectacles lens 4.

The spectacles lens 4 has respective markings (30, 32) in the marking points (16, 18). The markings (30, 32) are permanent markings. The markings (30, 32) are composed of a multiplicity of pixels and are produced by laser engraving. The sets of pixel markings (30, 32) have respective convex envelopes (34, 36) with a square external envelope. Here, in accordance with the definition of "convex envelope" specified in the German "Wikipedia", the convex envelope of a set is understood to mean the smallest convex set containing the set.

The side lengths A of the square external contour of the convex envelopes (34, 36) are each 2 mm. The position of the marking points (16, 18) is specified on the spectacles lens 4 by the position of the markings (30, 32). The location of the geometric centroid of the convex envelope (34, 36) of the marking (30, 32), that is, the surface surrounded by the square external contour of the convex envelope (34, 36), corresponds to the geometric location of the marking points (16, 18). The markings (30, 32) are phase objects. They are therefore invisible to a spectacles wearer when wearing the spectacles. The marking 30 is designed as a company logo.

In the coordinate system 20, the points of the near reference point 12 and the far reference point 14 can be uniquely described by the tuple of numbers $(x_N, y_N)$ for the near reference point and the tuple of numbers $(x_F, y_F)$ for the far reference point.

Figure 3:
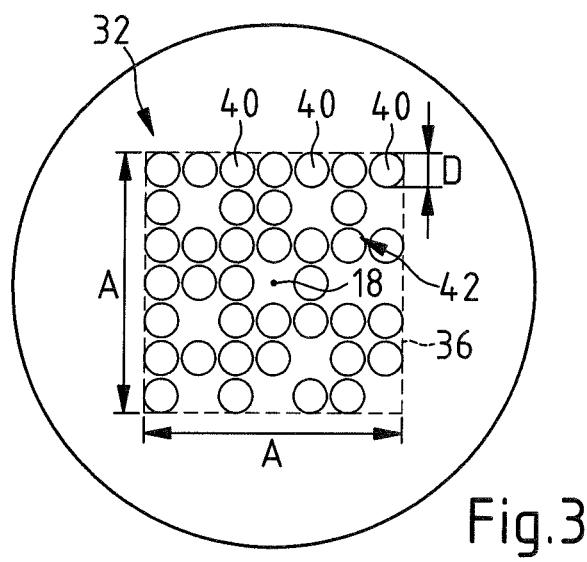
FIG. 3 shows a detail of the spectacles lens with a marking in the form of a data matrix code.

FIG. 3 shows a section III of the spectacles lens 4 from FIG. 2. The marking 32 is a data matrix code. The data matrix code contains data and corresponds to the ISO/IEC 16022:2000 standard incorporated herein by reference. The marking 32 consists of a multiplicity of pixels 40. The pixels 40 have a diameter D=80 μm. The pixels are burnt into the spectacles lens with a depth of T=2 μm by means of laser radiation from an excimer laser. The arrangement of the pixels 40 defines an information in the data matrix code.

The information from the data matrix code of the marking 32 individualizes the spectacles lens 4. To this end, the information in the marking 32 is comprised of a database address for a database in which specifications of the spectacles lens manufacturer in respect of the spectacles lens are stored. Alternatively, or in addition thereto, the data matrix code of the marking 32 can contain the information in respect of the points of the near reference point 12 and the far reference point 14 in the form of the tuple of numbers $(x_N, y_N)$ for the near reference point and the tuple of numbers $(x_F, y_F)$ for the far reference point. Moreover, the data matrix code of the marking 32 can alternatively, or in addition thereto, also comprise the information in respect of the material of the spectacles lens, the refractive index thereof and the value of the curvatures of the spectacles lens 4 on the front surface and back surface, at the far and near reference points (14, 16) or at the positions opposite these points.

Figure 4:
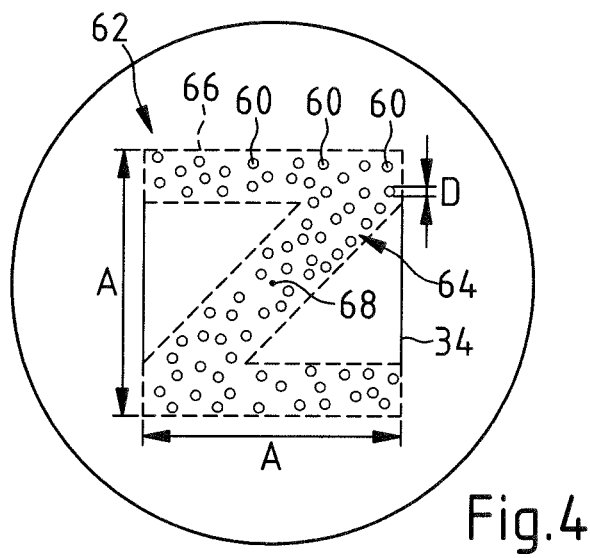
FIG. 4 shows a detail of a further spectacles lens with a marking composed of pixels.

FIG. 4 shows a section of a further spectacles lens with a marking 62 composed of pixels 60. The diameter D of the pixels 60 corresponds to D≈80 μm. The pixels 60 are also burnt into the spectacles lens to a depth of T≈2 μm by means of laser radiation from an excimer laser. The arrangement of the pixels 60 is encoded information which individualizes the corresponding spectacles lens and which can be read by a suitable reading apparatus. Here, the pixels 60 of the marking 62 form a pattern 64, the outer contour 66 of which reproduces a company logo or trademark, which corresponds to the letter Z. The geometric centroid 68 of the convex envelope 34 corresponds to a marking point in the spectacles lens.

Figure 5:
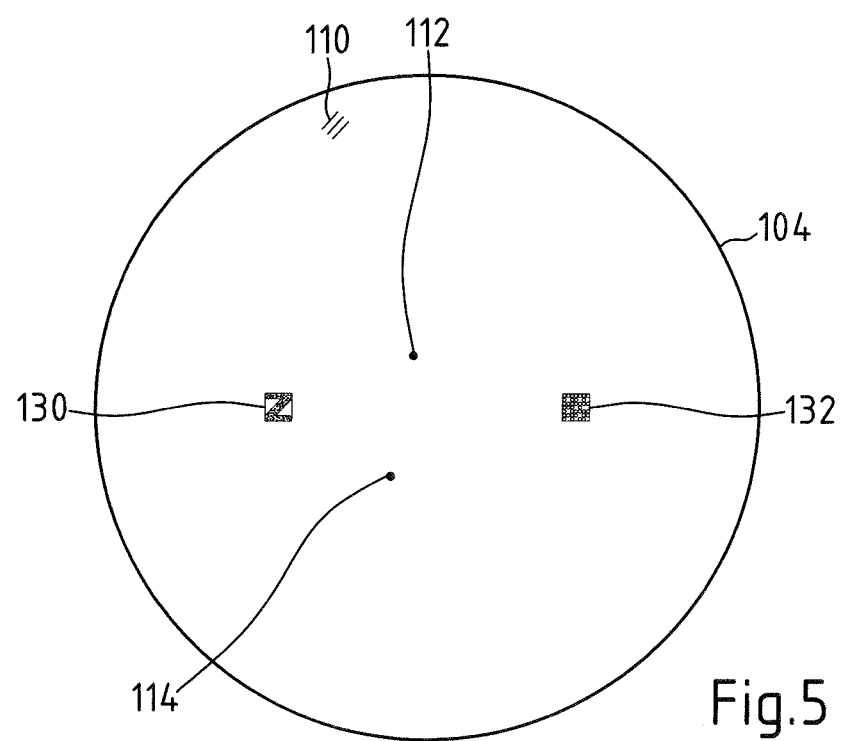
FIG. 5 shows a spectacles lens blank with markings that define a local coordinate system.

FIG. 5 shows a glass or plastic body embodied as spectacles lens blank 104. The spectacles lens blank 104 has markings (130, 132) which correspond to the markings (30, 32) on the spectacles lens 4 from FIG. 1. The markings (130, 132) are situated on the image-side surface of the spectacles lens blank 104, that is, on the surface facing away from the object. Information individualizing the spectacles lens blank 104 is stored in the form of the marking 132. For example, this information is an address in a database wherein manufacturing-related data with respect to the spectacles lens blank 104 is stored. This manufacturing-related data can include, for example, the material of the spectacles lens, the refractive index thereof, the coordinates of the far and near reference points (114, 112), the value of the curvatures of the spectacles lens 104 on the front surface and back surface, at the far and near reference points (114, 112) or at the positions opposite these points, and also the date and location of the spectacles lens manufacture.

Figure 6:
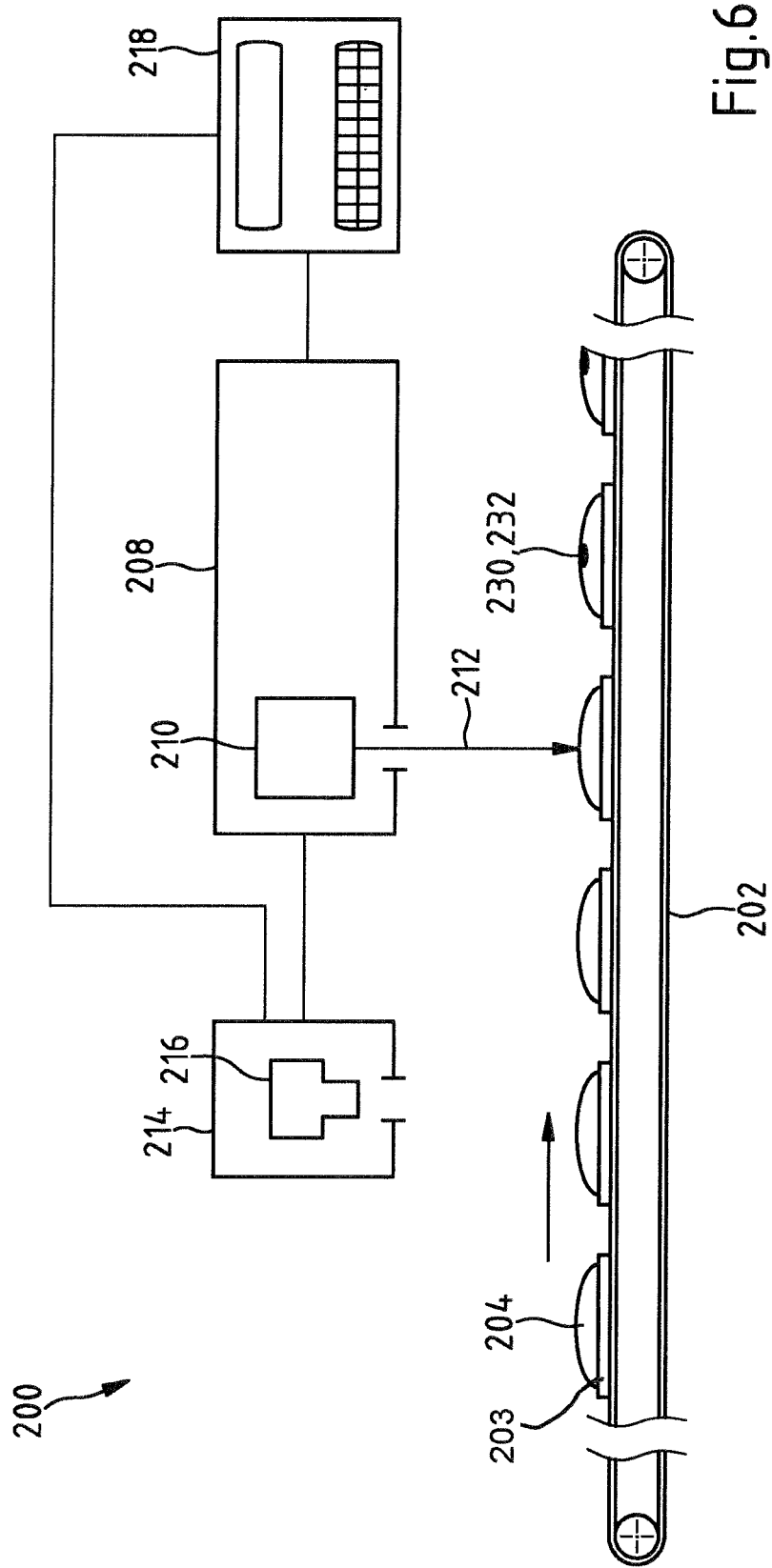
FIG. 6 shows an apparatus for marking spectacles lenses with a data matrix code; and, FIG. 7 shows an apparatus for reading the information stored on a spectacles lens with a data matrix code.

FIG. 6 shows an apparatus 200 for marking spectacles lens semi-finished products 204 with a data matrix code. The apparatus 200 contains a conveyor 202, on which the spectacles lens blanks 204 are fed to a marking system 208.

The spectacles lens blanks 204 are arranged on a support 203. For example, the spectacles lens blanks 204 can be blocked on such support. In the support 203, the position of the local coordinate system of the spectacles lens blank 204 is well defined with respect to the local coordinate system of the support 203.

The marking system 208 comprises an excimer laser 210. The excimer laser 210 generates a spatially displaceable laser beam 212, by means of which a data matrix code can be written into a spectacles lens semi-finished product 204. However, in principle, the apparatus 200 can also be used to mark finished spectacles lenses and raw spectacles lens blanks.

It is possible also to design the marking system 208 for marking spectacles lens glass or plastic bodies by chiselling, micro-drilling, impressing or printing.

A referencing arrangement 214 with a camera 216 is in the apparatus 200. The referencing arrangement 214 is used to reference the spatial coordinates of the glass or plastic bodies in the form of a spectacles lens, a spectacles lens semi-finished product or a spectacles lens blank 204, which was fed to the marking system 208, with respect to a coordinate system affixed to the marking system 208. For referencing the spatial coordinates of the glass or plastic bodies 204, the geometry of the support 203 is viewed with the camera 216 using image processing and relating the local coordinate system of the spectacles lens blank 204 affixed to the marking system 208.

It is to be noted that the referencing arrangement 214 also could be an adapter for a support 203 for the spectacles lens blanks 204, for example, an adapter which is formed as a chuck, in which the support 203 can have only a single well defined relative position in the coordinate system of the marking system 208.

These coordinates are transmitted to the marking system 208. This ensures that the marking system 208 can be used to write a data matrix code, which is oriented and arranged in a defined fashion with respect to a local coordinate system of the glass or plastic body, onto such a glass body 204. The apparatus 200 has an interface 218 for reading in individualization information for a glass or plastic body. This individualization information can, for example, as mentioned above, be an address under which manufacturing-specific data in respect of the glass or plastic body are correspondingly stored in a database. The individualization information can also comprise a running number, which specifies optical parameters of the spectacles lens blank, the material of which the spectacles lens blank consists, and the location and date of the manufacture thereof. This information is transmitted to the marking system 208, in order to store it in the form of a data matrix code on a spectacles lens blank 204.

To this end, the laser beam 212 from the marking system 208 in the apparatus 200 is used to write the appropriate data matrix code into each glass body 204, in the form of a marking 230 on a first marking point of the glass or plastic body 204. A further marking 232 is additionally applied to the second marking point. The further marking 232 is a trademark or a company logo.

On the glass or plastic body 204, the position of the markings (230, 232) defines the lens horizontal and the local coordinate system in which the coordinates stored in the data matrix code of the marking 232 specify the far and near reference point of the spectacles lens glass or plastic body 204.

Figure 7:
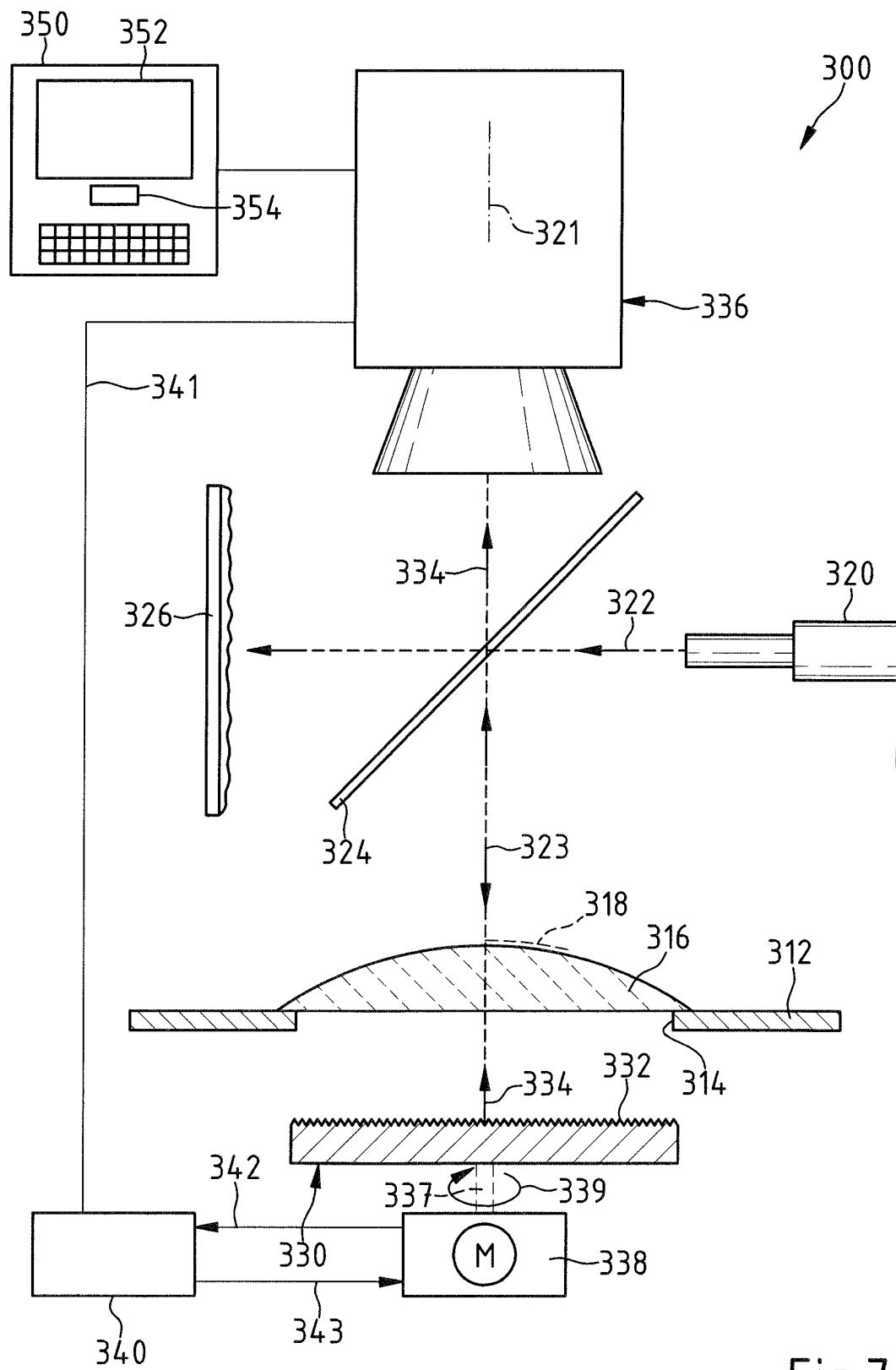

FIG. 7 shows an apparatus 300 by means of which the information stored on a spectacles lens in the form of a data matrix code can be read.

The apparatus 300 has a spectacles lens holder 312. The spectacles lens holder 312 has a cut-out 314. A spectacles lens 316 with a marking 318 in the form of a data matrix code is situated in the holder. The apparatus 300 contains a light source 320 for illumination light and a beam splitter 324. The light source 320 generates light which is guided to the beam splitter 324 with an optical beam path 322. The beam splitter deflects a first part of this light to the spectacles lens 316 with the beam path 323. This light passes through the spectacles lens 316 and is reflected at a rotating retroreflector 332. The light reflected by the retroreflector 332 once again passes through the spectacles lens 316 with the beam path 334 and is fed to a digital camera 336 via the beam splitter 324. The digital camera 336 has an optical axis 321. As a result of the optical axis 321 of the digital camera 336 lying in alignment with the optical axis of the beam path 334, it is possible to achieve good imaging quality for spectacles lens markings in the camera.

There is a motor 338 in the apparatus 300 for rotating the retroreflector 332; this motor is connected to the retroreflector 332 via a drive shaft 339. In order to capture the light from the light source 320 which passes through the beam splitter 324 in the direction of the beam path 322, the apparatus 300 contains a light trap 326.

Rotating the retroreflector 332 brings about a homogenization of the image background with which the digital camera 336 captures the marking 318 on the spectacles lens 316. To this end, a control device 340 is used to synchronize the rotational movement of the retroreflector 332 with the time points of an image recording by the digital camera 336 by means of electrical connection lines (341, 342, 343).

The apparatus 300 contains a computer unit 350 with an output interface in the form of a monitor 352. The computer unit 350 is connected to the digital camera 336. The computer unit 350 has a program storage medium 354 for capturing and decoding a marking 318, embodied as data matrix code, of a spectacles lens 316.

In order to read the data matrix code on a spectacles lens 316, illumination light passes through the spectacles lens 316 while the retroreflector 332 is moving and the section of the spectacles lens 316 with the marking 318 embodied as data matrix code is recorded by the digital camera 336. The image recorded in the process is read and processed by the computer unit 350 in order to display the decoded information of the data matrix code on the monitor 352.

A method is provided for storing information on a glass—or plastic body embodied as spectacles lens 4 or spectacles lens blank 104 or spectacles lens semi-finished product 204, wherein the information in the form of data on or in the glass—or plastic body (4, 104, 204) is stored by creating at least one marking (32, 132, 230, 232), which can be read by a reader 300, by means of a marking system 200, which has an interface 218 for reading information individualizing this glass—or plastic body (4, 104, 204), with the at least one marking (32, 132, 230, 232) being created permanently by the marking system 200 on or in the glass—or plastic body (4, 104, 204) at a definition point 16 of a local body-specific coordinate system 20 set by two points (16, 18) on or in the glass—or plastic body (4, 104, 204), for the manufacturer-side specification of the position of the lens horizontal 24 and/or the distance and/or the near and/or the prism reference point (14, 12, 11).

The method wherein the marking (32, 132, 230, 232) created on or in the glass—or plastic body (4, 104, 204) together with a further marking 30, preferably designed as trademark and/or company logo, created on or in the glass—or plastic body (4, 104, 204) sets the local body-specific coordinate system 20 for the manufacturer-side specification of the position of the lens horizontal 24 and/or the distance and/or near and/or prism reference point (14, 12, 11).

The method wherein the marking 32 created on or in the glass—or plastic body 4 is a phase object.

The method wherein the marking 232 is created by laser engraving, chiseling, micro-drilling, impressing or printing.

The method wherein a multiplicity of pixels 40 are generated for creating the marking 32 on or in the glass—or plastic body 4, the pixels having a diameter D lying in the range $60 \,\mu m \leq D \leq 100 \,\mu m$ and having a depth T which is $0.5 \,\mu m \leq T \leq 2.5 \,\mu m$.

The method wherein the marking 32 is a digital code composed of individual pixels 40.

The method wherein the marking 32 is a data matrix code.

The method wherein the marking 32 has a convex envelope 36 with a square external contour which has a side length A, which is preferably $1.5 \,mm \leq A \leq 2.5 \,mm$.

The method wherein the geometric centroid 18 of the convex envelope 36 of the marking is a definition point 16 of a local coordinate system 20 defining the lens horizontal 24 and/or the distance and/or near reference point (14, 12) and/or prism reference point 11.

The method wherein the pixels 60 of the marking 62 are arranged in a pattern 64, the external contour 66 of which reproduces a trademark and/or a company logo, more particularly a letter, and/or in that the pixels 60 of the marking 62 replicate a trademark and/or a company logo 32.

The glass—or plastic body embodied as spectacles lens 4, spectacles lens blank 104 or spectacles lens semi-finished product 204, more particularly a progressive power spectacles lens or an individual single-vision lens of the invention comprises a marking 32 arranged on or in the glass—or plastic body (4, 104, 204) at a definition point 18 of the local glass—or plastic body coordinate system 20 for the manufacturer-side specification of the position of the lens horizontal 24 and/or the distance and/or the near and/or the prism reference point (14, 12, 11) and/or wherein the marking contains information in the form of data which individualizes the glass—or plastic body 4, in particular stored by means of a method as described above.

The glass—or plastic body wherein the marking (32, 132, 230) together with a further marking (30, 130, 232), preferably designed as trademark and/or company logo, arranged on or in the glass—or plastic body (4, 104, 204) sets the local glass—or plastic body coordinate system 20 for the manufacturer-side specification of the position of the lens horizontal 24 and/or the distance and/or near and/or prism reference point (14, 12, 11).

The glass—or plastic body wherein the marking 32 created on or in the glass—or plastic body 4 is a phase object.

The glass—or plastic body wherein the marking contains a multiplicity of pixels 40 which have a diameter D lying in the range $60 \,\mu m \leq D \leq 100 \,\mu m$ and which have a depth T which is $0.5 \,\mu m \leq T \leq 2.5 \,\mu m$.

The glass—or plastic body wherein the marking 32 is a digital code composed of individual pixels 40, more particularly a data matrix code 30.

The glass—or plastic body can be characterized in that wherein the pixels 60 of the marking 62 replicate a trademark and/or a company logo 32.

The glass—or plastic body wherein the set of pixels 60 of the marking 32 has a convex envelope 36 with a square external contour which has a side length A, which is preferably $1.5 \,mm \leq A \leq 2.5 \,mm$.

The glass—or plastic body wherein the geometric centroid 18 of the convex envelope 36 of the marking 32 is a definition point 16 of a local coordinate system 20 defining the lens horizontal 24 and/or the distance and/or near reference point (14, 12) and/or prism reference point 11.

The glass—or plastic body wherein the external contour 66 of the marking 62 reproduces a trademark and/or a company logo, more particularly a letter.

A device 200 is provided for storing information on a glass—or plastic body embodied as spectacles lens 4, spectacles lens blank 104 or spectacles lens semi-finished product 204, using a method as described above, wherein a marking system 208 for marking a glass—or plastic body 204, by virtue of a marking 230, 232 containing information individualizing a glass—or plastic body 204 being created on or in the glass—or plastic body 204, an interface 218 connected to the marking system 208, for reading information individualizing the glass—or plastic body 204 to be marked, and a referencing arrangement 214, connected to the marking system 208, for establishing the position of the local glass—or plastic body coordinate system 20 on the glass—or plastic body 204 to be marked, specifying the lens horizontal 24 and/or the distance and/or the near reference point (14, 12) and/or the prism reference point, with the marking system 208 marking the glass—or plastic body 204 by virtue of the fact that the information, read in at the interface 218 and individualizing this glass—or plastic body 204, is transferred onto or into the glass—or plastic body 204 by applying a marking (230, 232) containing this information to a definition point (16, 18) of the local glass—or plastic body coordinate system 20, established by the referencing arrangement 214 for this glass—or plastic body, specifying the lens horizontal 24 and/or the distance and/or near reference point (14, 12) and/or the prism reference point 11.

A method is provided for reading digital information stored on a glass—or plastic body embodied as described above, wherein an illumination light beam (322, 323) is directed at the glass—or plastic body 316, the former passing through the glass—or plastic body 316 and being reflected at a reflector 332 after passing through the glass—or plastic body 316 in order once again to pass through the glass—or plastic body 316 and then being fed to a camera 336, which is connected to a computer unit 350 which contains a program storage medium 354 with an evaluation program for capturing and decoding the information from the marking (318).

A reader 300 is provided for reading digital information stored on a glass—or plastic body 316 embodied as described above wherein a light source 320 for generating an illumination light beam (322, 323) which passes through a glass—or plastic body 316 to be read, is reflected at a reflector 332 after passing through the spectacles lens 316 in order once again to pass through the spectacles lens 316 and then is fed to a camera 336, which is connected to a computer unit 350 which contains a program storage medium 354 with an evaluation program for capturing and decoding the information from the marking 318.

In conclusion, the following preferred features of the invention in particular should be retained: On a glass or plastic body embodied as spectacles lens 4, spectacles lens blank 104 or spectacles lens semi-finished product 204, information in the form of data on or in the glass or plastic body (4, 104, 204) is stored by creating at least one marking (32, 62, 130, 230), which can be read by a reader 300, by means of a marking system 208. The marking system 208 has an interface 218 for reading information individualizing this glass or plastic body (4, 104, 204). The at least one marking (32, 62, 130, 230) is created permanently by the marking system 208 on or in the glass body (4, 104, 204) at a definition point 16 of a local coordinate system 20 set by two points (16, 18) on or in the glass or plastic body (4, 104, 204), for the manufacturer-side specification of the position of the lens horizontal 24 and/or the distance and/or the near and/or the prism reference point (14, 12, 11).

It is understood that the foregoing description is that of the preferred embodiments of the invention and that various changes and modifications may be made thereto without departing from the spirit and scope of the invention as defined in the appended claims.

What is claimed is:

1. A method for storing digital information on a glass or plastic body embodied as a spectacles lens or spectacles lens blank or spectacles lens semi-finished product, the method comprising the steps of:
   providing a progressive power spectacles lens or spectacle lens blank or spectacle lens semi-finished product with a first permanent marking and a second permanent marking arranged on or in the glass or plastic body;
   wherein said first permanent marking contains information in the form of a data matrix code which individualizes the glass or plastic body so as to make the glass or plastic body unique with respect to all other glass or plastic bodies;
   wherein said first permanent marking is arranged at a first definition point of the local glass or plastic body coordinate system, and said second permanent marking is arranged at a second definition point of the local glass or plastic body coordinate system;
   wherein said first permanent marking and said second permanent marking are mutually spaced at 34 mm and arranged with reference to a vertical plane through a fitting point or a prism reference point; and,
   the data matrix code including the positions of the near reference point and the distance reference point in the form of the tuple of numbers ($x_N$, $y_N$) for the near reference point and the tuple of number ($x_F$, $y_F$) for the distance reference point with respect to said coordinate system.

2. The method of claim 1, wherein the first permanent marking created on or in the glass or plastic body and containing information in the form of the data matrix code which individualizes the glass or plastic body is a phase object which, when irradiated by light in the visible spectral range, only changes the phase of the light waves passing through the object without there being a significant influence on the amplitude of the light waves in the process and the second permanent marking is designed as trademark and/or company logo.

3. The method of claim 1, wherein the first permanent marking contains information in the form of the data matrix code which individualizes the glass or plastic body is created by laser engraving, chiseling, micro-drilling, impressing or printing.

4. The method of claim 3, wherein a multiplicity of pixels are generated for creating the first permanent marking containing information in the form of the data matrix code which individualizes the glass or plastic body on or in the glass or plastic body, said pixels having a diameter D lying in the range 60 µm≤D≤100 µm and having a depth T which is 0.5 µm≤T≤2.5 µm.

5. The method of claim 4, wherein the first permanent marking containing information in the form of the data matrix code which individualizes the glass or plastic body has a convex envelope with a square external contour which has a side length A, which is 1.5 mm≤A≤2.5 mm; and/or, the geometric centroid of the convex envelope of the first permanent marking containing information in the form of the data matrix code which individualizes the glass or plastic body is the definition point of the local glass or plastic body coordinate system.

6. The method of claim 5, wherein the pixels of the first permanent marking containing information in the form of the data matrix code which individualizes the glass or plastic body are arranged in a pattern, the external contour of which reproduces a trademark and/or a company logo and/or a letter in that the pixels of the marking replicate a trademark and/or a company logo.

7. A glass or plastic body embodied as a spectacles lens, spectacles lens blank for a spectacles lens or a spectacles lens semi-finished product for a spectacles lens, said glass or plastic body comprising:
   a first permanent marking and a second permanent marking arranged on or in the glass or plastic body;
   wherein one of said first and second permanent markings contains information in the form of a data matrix code which individualizes the glass or plastic body to make the glass or plastic body unique with respect to all other glass or plastic bodies;
   wherein said first permanent marking is arranged at a first definition point of the local glass or plastic body coordinate system, and said second permanent marking is arranged on or in the glass or plastic body at a second definition point of the local glass or plastic body coordinate system;
   wherein said first permanent marking and said second permanent marking are mutually spaced and arranged with reference to a vertical plane through a fitting point or a prism reference point;

the data matrix code including the positions of the near reference point and the distance reference point in the form of the tuple of numbers (xN, yN) for the near reference point and the tuple of number (xF, yF) for the distance reference point with respect to said coordinate system; and, wherein said first and second permanent markings are spaced at 34 mm.

8. The glass or plastic body of claim 7, wherein said one of the first permanent marking and the second permanent marking created on or in the glass or plastic body and containing information in the form of the data matrix code which individualizes the glass or plastic body is a phase object which, when irradiated by light in the visible spectral range, only changes the phase of the light waves passing through the object without there being a significant influence on the amplitude of the light waves in the process and the second permanent marking is designed as trademark and/or company logo.

9. The glass or plastic body of claim 8, wherein the other one of said first and second permanent markings contains pixels which replicate a trademark and/or a company logo.

10. The glass or plastic body of claim 8, wherein said one of said first and second permanent markings containing information in the form of the data matrix code which individualizes the glass or plastic body has a convex envelope with a square external contour which has a side length A, which is 1.5 mm≤A≤2.5 mm.

11. The glass or plastic body of claim 10, wherein the geometric centroid of the convex envelope of said one of said permanent markings containing information in the form of the data matrix code which individualizes the glass or plastic body is the definition point of the local glass or plastic body coordinate system corresponding to said one of said permanent markings.

12. The glass or plastic body of claim 8, wherein the external contour of the other one of said first and second permanent markings encloses a trademark and/or a company logo or a letter.

13. A glass or plastic body embodied as a spectacles lens, spectacles lens blank for a spectacles lens or a spectacles lens semi-finished product for a spectacles lens, said glass or plastic body comprising:

a first permanent marking and a second permanent marking arranged on or in the glass or plastic body;

wherein one of said first and second permanent markings contains information in the form of a data matrix code which individualizes the glass or plastic body to make the glass or plastic body unique with respect to all other glass or plastic bodies;

wherein said first permanent marking is arranged at a first definition point of the local glass or plastic body coordinate system, and said second permanent marking is arranged on or in the glass or plastic body at a second definition point of the local glass or plastic body coordinate system;

wherein said first permanent marking and said second permanent marking are mutually spaced and arranged with reference to a vertical plane through a fitting point or a prism reference point;

said first permanent marking and said second permanent marking being spaced at 34 mm;

the data matrix code including the positions of the near reference point and the distance reference point in said coordinate system in the form of the tuple of numbers (xN, yN) for the near reference point and the tuple of number (xF, yF) for the distance reference point; and, wherein said one of said first and second permanent markings, which contains information in the form of the data matrix code which individualizes the glass or plastic body, contains a multiplicity of pixels which have a diameter D lying in the range 60 μm≤D≤100 μm and which have a depth T which is 0.5 μm≤T≤2.5 μm.

14. The glass or plastic body of claim 13, wherein the other one of said first and second permanent markings is configured as a trademark and/or a company logo.

15. The glass or plastic body of claim 13, wherein said multiplicity of pixels of said one of said first and second permanent markings containing information in the form of the data matrix code which individualizes the glass or plastic body has a convex envelope with a square external contour which has a side length A, which is 1.5 mm≤A≤2.5 mm.

16. The glass or plastic body of claim 15, wherein the geometric centroid of the convex envelope of said one of said first and second permanent markings containing information in the form of the data matrix code which individualizes the glass or plastic body is the definition point of the local glass or plastic body coordinate system corresponding to said one of said first and second permanent markings.

17. The glass or plastic body of claim 13, wherein the external contour of the other one of said first and second permanent markings encloses a trademark and/or a company logo or a letter.

18. A glass or plastic body embodied as a spectacles lens, spectacles lens blank for a spectacles lens or a spectacles lens semi-finished product for a spectacles lens, said glass or plastic body comprising:

a first permanent marking and a second permanent marking arranged on or in the glass or plastic body;

wherein one of said first and second permanent markings contains information in the form of a data matrix code which individualizes the glass or plastic body to make the glass or plastic body unique with respect to all other glass or plastic bodies;

wherein said first permanent marking is arranged at a first definition point of the local glass or plastic body coordinate system, and said second permanent marking is arranged on or in the glass or plastic body at a second definition point of the local glass or plastic body coordinate system;

wherein said first permanent marking and said second permanent marking are mutually spaced and arranged with reference to a vertical plane through a fitting point or a prism reference point;

said first permanent marking and said second permanent marking being spaced at 34 mm;

the data matrix code including the positions of the near reference point and the distance reference point in said coordinate system in the form of the tuple of numbers (xN, yN) for the near reference point and the tuple of number (xF, yF) for the distance reference point; and, wherein said one of said permanent markings, which contains information in the form of the data matrix code which individualizes the glass or plastic body, contains a multiplicity of pixels.

* * * * *